US008487029B2

(12) United States Patent
Wang

(10) Patent No.: US 8,487,029 B2
(45) Date of Patent: Jul. 16, 2013

(54) THERMOSETTING POLYMER-BASED COMPOSITE MATERIALS

(75) Inventor: Xiujun Wang, Acton, MA (US)

(73) Assignee: Globe Composite Solutions, Ltd., Rockland, MA (US)

( * ) Notice: Subject to any disclaimer, the term of this patent is extended or adjusted under 35 U.S.C. 154(b) by 0 days.

(21) Appl. No.: 12/357,644

(22) Filed: Jan. 22, 2009

(65) Prior Publication Data

US 2009/0198007 A1 Aug. 6, 2009

Related U.S. Application Data

(60) Provisional application No. 61/022,611, filed on Jan. 22, 2008.

(51) Int. Cl.
*C04B 28/14* (2006.01)

(52) U.S. Cl.
USPC ........... 524/423; 524/440; 524/441; 264/299; 264/126

(58) Field of Classification Search
USPC .................................. 524/440, 413, 436, 423
See application file for complete search history.

(56) References Cited

U.S. PATENT DOCUMENTS 4,938,233 A 7/1990 Orrison, Jr.
5,245,195 A 9/1993 Shah et al.
5,548,125 A 8/1996 Sandbank
5,719,352 A 2/1998 Griffin
6,048,379 A 4/2000 Bray et al.
6,153,666 A 11/2000 Lagace
6,284,817 B1 * 9/2001 Cross et al. .................. 523/220
6,310,355 B1 10/2001 Cadwalader
6,517,774 B1 * 2/2003 Bray et al. ...................... 419/65
6,583,432 B2 6/2003 Featherby et al.
6,740,260 B2 5/2004 McCord
6,815,066 B2 11/2004 Elliott
6,967,343 B2 11/2005 Batten et al.
2003/0119989 A1 6/2003 Ladd et al.
2003/0192448 A1 10/2003 LeaSure
2004/0029998 A1 2/2004 Tomita et al.
2004/0079904 A1 4/2004 Batten et al.
2004/0124374 A1 7/2004 Joseph
2005/0004268 A1 * 1/2005 Lynch ........................... 523/213
2005/0064223 A1 * 3/2005 Bavaro et al. ................. 428/615
2005/0211930 A1 * 9/2005 DeMeo et al. ............. 250/516.1
2005/0258404 A1 11/2005 McCord
2006/0027129 A1 * 2/2006 Kolb et al. .................... 102/517
2006/0255299 A1 11/2006 Edwards et al.
2007/0017160 A1 1/2007 Caldwell et al.
2007/0051634 A1 3/2007 Poole et al.
2007/0145294 A1 * 6/2007 McCord ..................... 250/474.1
2007/0148470 A1 6/2007 Mallozzi et al.

FOREIGN PATENT DOCUMENTS

GB 2004289 3/1979
WO 2004052974 6/2004
WO 2005017556 A2 2/2005
WO 2009020948 2/2009
WO WO 2009094419 A1 * 7/2009

OTHER PUBLICATIONS

Hexion EPON 8111 Technical Data Sheet, 2001.*
Dow Chemical Product Information: D.E.N. 438.*
http://www.periodictable.com, 2012.*
International Search Report for PCT/US2009/031654, dated Jun. 26, 2009.

* cited by examiner

*Primary Examiner* — Doris Lee
(74) *Attorney, Agent, or Firm* — Michaud-Kinney Group LLP

(57) ABSTRACT

A lead-free, non-toxic composite material including a thermosetting polymer and at least one of a heavy particulate filler, a light particulate filler or a combination thereof. The composite material may be utilized in manufacturing articles used in radiation shielding applications.

19 Claims, No Drawings

THERMOSETTING POLYMER-BASED COMPOSITE MATERIALS

CROSS-REFERENCE TO RELATED APPLICATION

This application claims priority benefit under 35 U.S.C. §119(e) of co-pending U.S. Provisional Patent Application Ser. No. 61/022,611 filed Jan. 22, 2008, which is hereby incorporated by reference in its entirety.

BACKGROUND OF THE INVENTION

1. Field of the Invention

The disclosed subject matter relates to thermosetting polymer-based composite materials. More specifically, the disclosed subject matter relates to lead-free, non-toxic thermosetting polymer-based composite materials, which may be used in radiation shielding, weight-balancing, ballast or energy storage applications.

2. Description of Related Art

Lead has been used in many industries for decades. For instance, lead is widely used for radiation shielding applications due to its efficiency and low cost. While efficient and low-cost, lead has been found to be toxic to animals, and particularly toxic to humans.

In response to the desire to reduce toxicity or the use of toxic compounds, and in order to comply with state, federal and international regulations regarding the use, transport and disposal of lead and lead-containing composites materials, numerous lead substitutes and lead-free composite materials have been developed as replacements for lead or lead-filled composite materials. Lead substitutes and lead-free composite materials can be used in a variety of applications, including, but not limited to ammunition, construction and radiation shielding applications.

While lead-free composite materials developed for use in radiation shielding applications thus far may offer the benefit of reduced or no toxicity, it has been found that lead-free composite materials containing fillers in certain amounts increase the viscosity of the composite material. At certain levels of filler content, viscosity becomes so high that the ability to cast the material is reduced or lost completely. As is appreciated to one of ordinary skill in the art, it is desirable to not only have a non-toxic composite material for use in radiation shielding applications, but to have a material that is easily used in making final products. Accordingly, any reduction or loss of the ability to cast the composite material may be challenging when lead-free composite materials are utilized.

A lead-free, non-toxic composite material that is efficient in radiation protection, economical to make and use as well as easily handled and castable or processed by other methods, such as liquid phase sintering, is desired.

SUMMARY OF THE INVENTION

One aspect of the disclosed subject matter relates to a lead-free, non-toxic composite material, said composite material comprising: a thermosetting polymer; and at least one filler selected from a group consisting of a heavy particulate filler, a light particulate filler, and combinations thereof, wherein said heavy particulate filler is selected from a group consisting of tungsten, osmium, uranium, iridium, platinum, gold, molybdenum, tantalum, and combinations thereof and further wherein said light particulate filler is selected from the group consisting of barium sulfate, bismuth, iodine, zirconium, nickel, stainless steel, aluminum and combinations thereof.

Another aspect relates to a lead-free, non-toxic article comprising a lead-free, non-toxic composite material, said composite material comprising: a thermosetting polymer; and at least one filler selected from a group consisting of a heavy particulate filler, a light particulate filler, and combinations thereof, wherein said heavy particulate filler is selected from a group consisting of tungsten, osmium, uranium, iridium, platinum, gold, molybdenum, tantalum, and combinations thereof and further wherein said light particulate filler is selected from the group consisting of barium sulfate, bismuth, iodine, zirconium, nickel, stainless steel, aluminum and combinations thereof.

Another aspect relates to a method of manufacturing a lead-free, non-toxic radiation shielding device, said method comprising: combining a liquid thermosetting polymer and a filler selected from the group consisting of a heavy particulate, a light particulate and combinations thereof to form a lead-free, non-toxic composite material, wherein said heavy particulate filler is selected from a group consisting of tungsten, osmium, uranium, iridium, platinum, gold, molybdenum, tantalum, and combinations thereof and further wherein said light particulate filler is selected from the group consisting of barium sulfate, bismuth, iodine, zirconium, nickel, stainless steel, aluminum and combinations thereof; and casting said lead-free, non-toxic composite material to form a lead-free, non-toxic article.

Yet a further aspect relates to a method of manufacturing a lead-free, non-toxic radiation shielding device, said method comprising: combining a solid thermosetting polymer and a filler selected from a heavy particulate, a light particulate and combinations thereof to form a lead-free, non-toxic composite material, wherein said heavy particulate filler is selected from a group consisting of tungsten, osmium, uranium, iridium, platinum, gold, molybdenum, tantalum, and combinations thereof and further wherein said light particulate filler is selected from the group consisting of barium sulfate, bismuth, iodine, zirconium, nickel, stainless steel, aluminum and combinations thereof; and liquid phase sintering said lead-free, non-toxic composite material to form a lead-free, non-toxic article.

The above described and other features are exemplified by the following figures and detailed description.

DETAILED DESCRIPTION

One embodiment of the disclosed composite material includes a thermosetting polymer and at least one filler selected from a heavy particulate filler, a light particulate filler or a combination thereof. The terms "heavy" and "light" refer to the specific gravity of the particulate fillers. Neither a heavy particulate filler nor a light particulate filler must have a specific gravity within a given range. Rather, in general, a heavy particulate filler has a higher specific gravity than a light particulate filler.

The composite material may be lead-free and non-toxic and may possess radiation shielding capabilities covering a broad range of radiation shielding levels, from as low as 5 peak kilovoltage (5 kVp) to as high as about 300 peak kilovoltage (300 kVp) in radiation energy levels.

Furthermore, the composite material may have a high specific gravity. The specific gravity may be between, for example, 1.5 and 12. In one example, the composite material may have a specific gravity between 1.5 and 3.0. In another example, the composite material may have a specific gravity between 3.0 and 6.0. In yet a further example, the composite material may have a specific gravity between 3.0 and 5.0. In yet another example, the composite material may have a specific gravity between 2.5 and 6.0. In a further example, the composite material may have a specific gravity between 2.0 and 4.5. In yet another example, the composite material may have a specific gravity between 2.5 and 12.

It has been found that the rate of radiation transmission passing through the composite materials is reduced inversely to the density of the composite materials. The composite material may be used in a variety of manners and applications, including, but not limited to, being cast as a radiation shield, applied to objects as a shielding layer, or applied to objects as a coating.

The thermosetting polymer may be any thermosetting polymer known in the art. Thermosetting polymers in composite materials are often referred to as a matrix or a binder. Examples of thermosetting polymers include polymer materials that irreversibly cure to a stronger form. The cure may be done through heat (generally above 200 degrees Celsius), through a chemical reaction (two-part epoxy, for example), or irradiation such as electron beam processing. Specific examples of thermosetting polymers include, but are not limited to, epoxy resins, urethanes, silicones, un-saturated esters or a combination thereof.

In one example of the composite material, the thermosetting polymer is an epoxy resin. The epoxy resin may be in liquid or solid form. If in liquid form, the composite material is able to be poured or cast by conventional casting techniques. If, however, the epoxy resin is in solid form, the composite material may be processed by a liquid phase sintering process, where the thermosetting polymer is melted and a conventional curing process follows.

The epoxy resin used in the composite material may have an epoxide equivalent weight in the range of 100 to 590, and a viscosity in the range of 40 poise to 250 poise. In another example, the epoxy resin has a viscosity in the range of 60 poise to 200 poise. In yet another example, the viscosity of the epoxy resin is between 80 poise to 170 poise.

In one example, the epoxy resin has low molecular weight. The epoxy resin may also have outstanding resistance to pigment and filler settling. Resistance to pigment and filler settling allow for a uniform dispersion of the fillers and pigments present in the composite material. The epoxy resin may also have superior resistance to foaming under vacuum. Specific examples of liquid epoxy resins include, but are not limited to the diglycidyl ether of Bisphenol A, available as Epon™ 8280 epoxy resin and the diglycidyl ether of Bisphenol F, which is available as Epon™ 862 epoxy resin, both available from Hexion Specialty Chemicals, Columbus, Ohio, United States. A specific example of a solid epoxy resin is the diglycidyl ether of Bisphenol A Epon™ 3002, also available from Hexion Specialty Chemicals, Columbus, Ohio, United States.

In one example, the composite material includes between 0.5% and 50% by weight of the epoxy resin, based on the weight of the composite material. In another example, the composite material includes between 10% and 50% by weight of epoxy resin, based on the weight of the composite material. In yet a further example, the composite material includes between 0.5% and 30% by weight of epoxy resin, based on the weight of the composite material.

In another example of the composite material, the thermosetting polymer is a urethane. Typically, the urethane is in liquid form, thereby allowing the composite material to be pourable or castable by conventional methods. The urethane may be a low viscosity urethane. In yet another example of the composite material, the thermosetting polymer is a urethane prepolymer having a pot life greater than 5 minutes. In another example, the pot life of the urethane prepolymer has a pot life greater than 10 minutes.

A specific example of a urethane is a reaction product of polyether with toluene diisocyanate, available as Adiprene® L100 and Adiprene® L42 from Chemtura Corporation, Middlebury, Conn., United States.

In one example, the lead-free, non-toxic composite material includes between 0.5% and 50% by weight of the thermosetting polymer, based on the weight of the composite material. In another example, the composite material includes between 0.5% and 40% by weight of the thermosetting polymer, based on the weight of the composite material. In yet another example, the composite material includes between 0.5% and 35% by weight of the thermosetting polymer, based on the weight of the composite material. In a further example, the composite material includes between 0.5% and 30% by weight of the thermosetting polymer, based on the weight of the composite material. In yet a further example, the composite material includes between 0.5% and 25% by weight of the thermosetting polymer, based on the weight of the composite material. In yet another example, the composite material includes between 0.5% and 20% by weight of the thermosetting polymer, based on the weight of the composite material. In yet a further example, the composite material includes between 10% and 30% by weight of the thermosetting polymer, based on the weight of the composite material. In yet another example, the composite material includes between 10% and 25% by weight of the thermosetting polymer, based on the weight of the composite material. In a further example, the composite material includes between 10% and 20% by weight of the thermosetting polymer, based on the weight of the composite material. In yet another example, the composite material includes between 5% and 35% by weight of the thermosetting polymer, based on the weight of the composite material. In a further example, the composite material includes between 5% and 30% by weight of the thermosetting polymer, based on the weight of the composite material.

The lead-free, non-toxic composite material may also include at least one filler selected from a heavy particulate filler, a light particulate filler or a combination thereof. Fillers are generally known and are used in polymers for a variety of reasons, including, but not limited to, cost reduction, improved processing, density control, optical effects, thermal conductivity, control of thermal expansion, electrical properties, magnetic properties, flame retardancy and improved mechanical properties, such as hardness and tear resistance.

It is contemplated that any filler may be used in the composite material described herein. The heavy particulate filler in the composite material may have a high atomic number. Examples of heavy particulate fillers include, but are not limited to tungsten, osmium, uranium, iridium, platinum, gold, molybdenum, tantalum, and combinations thereof. The composite material may include one or more different heavy particulate fillers. Heavy particulate fillers utilized in the composite material may be in any form, e.g., powder form or granular form.

The composite material may contain any amount of heavy particulate filler desired. The amount of heavy particulate filler will vary depending on processability, desired densities and specific levels of radiation shield in the composite material. In one example, the composite material contains between about 0% and about 99.5% by weight of the heavy particulate filler, based on the weight of the composite material. In another example, the composite material contains between about 0% and about 95% by weight of the heavy particulate filler, based on the weight of the composite material. In still another example, the composite material contains between about 0% and about 80% by weight of the heavy particulate filler, based on the weight of the composite material. In still another example, the composite material contains between about 10% and about 99.5% by weight of the heavy particulate filler, based on the weight of the composite material. In another example, the composite material contains between about 10% and about 95% by weight of the heavy particulate filler, based on the weight of the composite material. In still another example, the composite material contains between about 10% and about 80% by weight of the heavy particulate filler, based on the weight of the composite material. In still another example, the composite material contains between about 20% and about 99.5% by weight of the heavy particulate filler, based on the weight of the composite material. In another example, the composite material contains between about 20% and about 95% by weight of the heavy particulate filler, based on the weight of the composite material. In still another example, the composite material contains between about 20% and about 80% by weight of the heavy particulate filler, based on the weight of the composite material. In still another example, the composite material contains between about 40% and about 99.5% by weight of the heavy particulate filler, based on the weight of the composite material. In another example, the composite material contains between about 40% and about 95% by weight of the heavy particulate filler, based on the weight of the composite material. In still another example, the composite material contains between about 40% and about 80% by weight of the heavy particulate filler, based on the weight of the composite material. In still another example, the composite material contains between about 40% and about 70% by weight of the heavy particulate filler, based on the weight of the composite material. In another example, the composite material contains between about 50% and about 85% by weight of the heavy particulate filler, based on the weight of the composite material. In still another example, the composite material contains between about 50% and about 80% by weight of the heavy particulate filler, based on the weight of the composite material.

Typically, the heavy particulate fillers have an average particle size between about 0.1 micron and about 200 microns. In another example, the heavy particulate fillers have an average particle size between about 0.5 micron and about 200 microns. In another example, the heavy particulate fillers have an average particle size between about 0.1 micron and about 100 microns. In a further example, the heavy particulate fillers have an average particle size between 0.5 micron and 100 microns. In yet another example, the heavy particulate filler has an average particle size between about 0.5 micron and 50 microns. In still a further example, the heavy particulate filler has an average particle size between about 1.0 micron and 15 microns.

In one example of the composite material, the heavy particulate filler is tungsten. Tungsten may be used in either granule or powder form or a combination thereof. Tungsten may be used alone or in combination with one or more heavy particulate fillers. In another example, tungsten may be used in combination with one or more light particulate fillers. In yet a further example, tungsten may be used in combination with one or more heavy particulate fillers as well as in combination with one or more light particulate fillers.

Examples of light particulate fillers include, but are not limited to fillers having a high atomic number. Specific examples of light particulate fillers include, but are not limited to, barium sulfate, bismuth, iodine, zirconium, zirconium oxide, nickel, stainless steel, copper, silver, titanium, titanium oxide, zinc oxide, zinc sulfide, antimony oxide, aluminum, and the like and combinations thereof. It is contemplated that the composite material may contain one or more different light particulate fillers.

The composite material may contain any amount of light particulate filler desired. The amount of light particulate filler will vary depending on processability, desired densities and specific levels of radiation shield in the composite material. In one example, the composite material contains between about 0% and about 99.5% by weight of the light particulate filler, based on the weight of the composite material. In another example, the composite material contains between about 0% and about 95% by weight of the light particulate filler, based on the weight of the composite material. In still another example, the composite material contains between about 0% and about 80% by weight of the light particulate filler, based on the weight of the composite material. In still another example, the composite material contains between about 10% and about 99.5% by weight of the light particulate filler, based on the weight of the composite material. In another example, the composite material contains between about 10% and about 95% by weight of the light particulate filler, based on the weight of the composite material. In still another example, the composite material contains between about 10% and about 80% by weight of the light particulate filler, based on the weight of the composite material. In still another example, the composite material contains between about 20% and about 99.5% by weight of the light particulate filler, based on the weight of the composite material. In another example, the composite material contains between about 20% and about 95% by weight of the light particulate filler, based on the weight of the composite material. In still another example, the composite material contains between about 20% and about 80% by weight of the light particulate filler, based on the weight of the composite material. In still another example, the composite material contains between about 40% and about 99.5% by weight of the light particulate filler, based on the weight of the composite material. In another example, the composite material contains between about 40% and about 95% by weight of the light particulate filler, based on the weight of the composite material. In still another example, the composite material contains between about 40% and about 80% by weight of the light particulate filler, based on the weight of the composite material. In still another example, the composite material contains between about 40% and about 70% by weight of the light particulate filler, based on the weight of the composite material. In another example, the composite material contains between about 50% and about 85% by weight of the light particulate filler, based on the weight of the composite material. In yet another example, the composite material contains between about 50% and about 80% by weight of the light particulate filler, based on the weight of the composite material.

Typically, the light particulate fillers have an average particle size between about 0.5 micron and about 200 microns. In another example, the light particulate fillers have an average particle size between about 0.5 micron and about 100 microns. In yet a further example, the light particulate fillers have an average particle size between about 0.5 micron and about 50 microns. In still a further example, the light particulate fillers have an average particle size between about 1.0 micron and about 15 microns.

In one example of the composite material, the light particulate filler is barium sulfate. Barium sulfate may be used in either granule or powder form or a combination thereof. Barium sulfate may be used alone or in combination with one or more light particulate fillers. In another example, barium sulfate may be used in combination with one or more heavy particulate fillers, a specific example being barium sulfate used in combination with tungsten. In yet a further example, barium sulfate may be used in combination with one or more light particulate fillers as well as in combination with one or more heavy particulate fillers.

In one embodiment, the composite material includes a thermosetting polymer, a heavy particulate filler and a light particulate filler. The light particulate filler may inhibit the settling of the heavy particulate fillers. In one example, the heavy particulate filler and the light particulate filler have different particle sizes. In another example, both the heavy particulate filler and the light particulate filler have the same size particles. In one example, both the heavy particulate filler and the light particulate filler have particles between 0.5 micron and 15 microns in size.

The weight ratio of heavy particulate filler to light particulate filler present in the composite material will vary between materials and between applications the material is used in. In one example, the weight ratio of heavy particulate filler to light particulate filler is in a range from about 0:80 to about 99.5:0. In another example, the weight ratio of heavy particulate filler to light particulate filler is in a range from about 20:60 to about 99.5:0. In yet another example, the weight ratio of heavy particulate filler to light particulate filler is in a range from about 30:45 to about 99.5:0. In another example, the weight ratio of heavy particulate filler to light particulate filler is in a range from about 45:30 to about 99.5:0. In another example, the weight ratio of heavy particulate filler to light particulate filler is in a range from about 55:20 to about 99.5:0. In a further example, the weight ratio of heavy particulate filler to light particulate filler is in a range from about 55:20 to about 99.5:0. In another example, the weight ratio of heavy particulate filler to light particulate filler is in a range from about 60:15 to about 99.5:0. In another example, the weight ratio of heavy particulate filler to light particulate filler is in a range from about 64:16 to about 99.5:0. In yet another example, the weight ratio of heavy particulate filler to light particulate filler is in a range from about 72:8 to about 99.5:0. In a specific example, the weight ratio of heavy particulate filler to light particulate filler is 0:80. In another specific example, the weight ratio of heavy particulate filler to light particulate filler is 20:60. In a further example, the weight ratio of heavy particulate filler to light particulate filler is 30:45. In still another example, the weight ratio of heavy particulate filler to light particulate filler is 45:30. In another example, the weight ratio of heavy particulate filler to light particulate filler is 55:20. In yet another example, the weight ratio of heavy particulate filler to light particulate filler is 60:15. In yet another example, the weight ratio of heavy particulate filler to light particulate filler is 64:16. In another example, the weight ratio of heavy particulate filler to light particulate filler is 72:8. In still a further example, the weight ratio of heavy particulate filler to light particulate filler is 80:0. In another specific example, the weight ratio of heavy particulate filler to light particulate filler is 82:0. In a further specific example, the weight ratio of heavy particulate filler to light particulate filler is 86:0. In another specific example, the weight ratio of heavy particulate filler to light particulate filler is 90:0. In a further specific example, the weight ratio of heavy particulate filler to light particulate filler is 95:0. In still a further example, the weight ratio of heavy particulate filler to light particulate filler is 99.5:0.

In one embodiment, the composite material includes a light particulate filler, such as barium sulfate, wherein the composite material has a lower level radiation shielding ranging from about 5 kV to about 50 kV. In another embodiment, the composite material includes a combination of both a heavy particulate filler and a light particulate filler, such as, for example, tungsten powder and barium sulfate, to produce an intermediate density composite material that targets levels of radiation energy ranging from 50 kV to about 140 kV. In yet another embodiment, the composite material includes a combination of both a heavy particulate filler and a light particulate filler, such as, for example, tungsten powder and barium sulfate, to produce a high density composite material that targets high levels of radiation energy ranging from 140 kV to about 300 kV.

The amounts and ratios of heavy particulate fillers to light particulate fillers may be modified to produce composite materials that target different levels of radiation energy. Likewise, the amounts and ratios of heavy particulate fillers to light particulate fillers may be modified to increase the ease of processing, increase mechanical properties such as tensile strength and flexural modulus, and the like.

The composite material may also include an additive selected from a curative, a processing aid, a functional additive, a pigment, or combinations thereof. It is contemplated that the composite material may include more than one of the above-mentioned additives. Examples of curatives include, but are not limited to metaphenlenediamine (MPDA), diethylenetriamine (available as Epikure™ 3223, from Hexion Specialty Chemicals, Columbus, Ohio, United States), a blend of polyethylenepolyamines and propoxylated polyethylenepolyamines (available as Epikure™ 3290, from Hexion Specialty Chemicals, Columbus, Ohio, United States), an amine-based adduct curing agent (available as Epikure™ W Curing Agent, from Hexion Specialty Chemicals, Columbus, Ohio, United States), 4,4' methylene-bis-(ortho-chloroaniline) (also referred to as "MOCA"), 3,5-dimethylthiotoluylenediamine (available under the tradename Ethacure 300, from Albemarle Corporation, Baton Rouge, La., United States), and the like.

Examples of processing aids include, but are not limited to anti-foaming agents such as a silicone defoamer available as Antifoam 41-B, from Synalloy Corp., Cleveland, Tenn., United States. Examples of processing aids also include plasticizers, which may reduce viscosity to allow for easier processing and molding.

Examples of functional additives include, but are not limited to flame retardants, UV stabilizers and anti-fouling agents. Functional additives may also include fumed silica, which may be used as a viscosity modifier or Theological property modifier. Fumed silica is available as CAB-O-SIL® TS-720 and CAB-O-SIL® M-5, from Cabot Corporation, Boston, Mass., United States.

Typically, the additives are present in the composite material in an amount between 0% and about 15% by weight, based on the weight of the composite material. In one example, the additives are present in the composite material in an amount between 1% to about 15% by weight, based on the weight of the composite material. In still another example, the additives are presented in an amount between about 5% and about 15% by weight based on the weight of the composite material. In a further example, the additives are present in an amount between about 5% and about 12% by weight, based on the weight of the composite material. In still a further example, the additives are present in an amount between about 7% and about 10% by weight, based on the weight of the composite material. In yet a further example, the additives are present in an amount between about 8% and about 10% by weight, based on the weight of the composite material. In still another example, the additives are present in an amount between about 8% and about 12% by weight, based on the weight of the composite material. In yet a further example, the additives are present in an amount between about 8% and about 15% by weight, based on the weight of the composite material. In another example, the additives are present in an amount between about 7% and about 15% by weight, based on the weight of the composite material.

One or more curatives may be present in the composite material in an amount between about 0% and about 15% by weight, based on the weight of the composite material. In one example, the curatives may be present in the composite material in an amount between about 0% and about 10% by weight, based on the weight of the composite material. In yet another example, the curatives may be present in the composite material in an amount between about 0% and about 5% by weight, based on the weight of the composite material. In a further example, the curatives may be present in the composite material in an amount between about 0.2% and about 5% by weight, based on the weight of the composite material. In yet a further example, the curatives may be present in the composite material in an amount between about 0.2% and about 4% by weight, based on the weight of the composite material.

One or more pigments may be present in the composite material in an amount between about 0% and about 15% by weight, based on the weight of the composite material. In one example, pigments may be present in the composite material in an amount between about 0% and about 10% by weight, based on the weight of the composite material. In yet another example, pigments may be present in the composite material in an amount between about 0% and about 5% by weight, based on the weight of the composite material. In a further example, pigments may be present in the composite material in an amount between about 0% and 3.0% by weight, based on the weight of the composite material. In yet a further example, pigments may be present in the composite material in an amount between about 2.0% and 3.0% by weight, based on the weight of the composite material. In yet another example, pigments may be present in the composite material in an amount between about 0% and 2.5% by weight, based on the weight of the composite material.

Anti-foaming agents may be added to the composite material in an amount between 0% and 15% by weight, based on the weight of the composite material. In one example, anti-foaming agents are present in the composite material in an amount between 0% and 5% by weight, based on the weight of the composite material. In another example, the anti-foaming agents are present in the composite material in an amount between 0% and 1% by weight, based on the weight of the composite material. However, the anti-foaming agents are usually added to the composite material in a drop-wise manner. In one example, between zero and five (0-5) drops of anti-foaming agent are added to the composite material. In another example, between three and five (3-5) drops of anti-foaming agent are added to the composite material. In another example, 3 drops of anti-foaming agent are added to the composite material.

Various articles may be manufactured with the above-described composite material. For instance, radiation shielding articles may be manufactured from the composite materials. Examples of articles include, but are not limited to body shielding, reactor shielding, ion implantation machine source insulators, x-ray and gamma-ray tube housings, radioisotope housings, syringes housings for radiation shield applications, and the like. The composite material disclosed herein may also be used for ballast and other weight/balancing applications as well as for energy storage. Moreover, the composite material may be used as layers or coatings on articles used in radiation shielding. The composite material may also be used to manufacture casings, containers, laminates and other types of articles.

An article, such as a radiation shielding device, a ballast article, a weight-balancing article or an energy storage article, may be manufactured by combining a thermosetting polymer in a liquid form with a filler selected from a heavy particulate filler, a light particulate filler, or a combination thereof, to form a composite material. In one example, if more than one filler is included in the composite material, the fillers are dry-blended and mixed prior to being mixed with a liquid thermosetting polymer. The composite material is in a liquid form and able to be poured or cast to form the desired article, such as a radiation shielding device.

Casting is a method generally known in the art and involves, inter alia, combining specific components in certain amounts to form a desired liquid material and pouring the liquid material, such as the disclosed composite material, into a mold to form an article. Logos and identification markings may be embedded into the article either during or after the casting process.

In one example of casting a composite material, the thermo-setting polymer is pre-heated to a temperature between 150° Fahrenheit to 250° Fahrenheit, a curative is melted in an oven set at a temperature between 170° Fahrenheit to 190° Fahrenheit, and one or more fillers are mixed with the thermo-setting polymer until a uniform mixture is obtained. Once a uniform mixture is obtained, it is de-gassed for one to five minutes by adding anti-foam agent. One or more curatives are added to the mixture and the mixture is then de-gassed for a time period between thirty seconds and two minutes. The temperature of the mixture should be maintained between 130° Fahrenheit to 230° Fahrenheit. The mixture is then cast into the mold, which is pre-heated in an oven having a temperature between 150° Fahrenheit to 250° Fahrenheit. The mixture is cured for a time period between thirty and one hundred eighty minutes, after which it is de-molded and allowed to post-cure. Post cure may be between 1 and 20 hours at a temperature between 200° Fahrenheit to 500° Fahrenheit. The parameters of the casting process may vary between different composite materials.

Alternatively, an article, such as a radiation shielding device, a ballast article, a weight-balancing article, or an energy storage article, may be manufactured by combining a thermosetting polymer in a solid form with a filler selected from a heavy particulate filler, a light particulate filler, or a combination thereof, to form a composite material. The composite material is in a solid form. The solid composite material is subjected to liquid phase sintering to form an article, such as a radiation shielding device. Liquid phase sintering involves melting the solid composite material and then subjecting the composite material to a normal cure reaction process. Specifically, liquid phase sintering occurs when the thermosetting polymer together with the curatives, processing agents and fillers are used in powdered form, are mixed or blended at ambient temperature, transferred to a preheated mold and cured under pressure. The mold temperature is set above the melting temperatures for all of the components (excluding the fillers) while allowing the chemical reaction/curing reaction to take place. The temperature is set between 300 degrees Fahrenheit (300° F.) to 500 degrees Fahrenheit (500° F.) for 30 to 180 minutes in order to complete the chemical reaction/curing reaction, however, it is contemplated that the temperature and length of time can vary.

In one example, a non-castable composite material is used to manufacture a lead-free, non-toxic article by pre-heating a mold to a temperature between 230° Fahrenheit to 250° Fahrenheit. A solid thermo-setting polymer is mixed with a solid curative. In a composite material including two or more fillers, the fillers are combining in a separate container and mixed until uniform. The filler (or the mixture of the fillers) is then combined with the thermo-setting polymer and curative until a uniform mixture is obtained. The combining and mixing of the fillers with the thermo-setting polymer and curative may be done in a seal chamber. Once in a uniform state, the mixture is pre-heated in a press to a temperature between 150° Fahrenheit to 250° Fahrenheit. Liquid phase sintering is conducted for a time between thirty and sixty minutes, after which the mixture is de-molded and allowed to post-cure. Post cure can occur for a time period between one and sixteen hours at a temperature between 230° Fahrenheit to 300° Fahrenheit. Other parameters may be employed based on the composite material used.

The following are representative examples of composite materials as described herein. Unless otherwise noted, amounts given are in weight percent (% wt.).

EXAMPLES

TABLE 1

| Composite Materials | | | | | |
|---|---|---|---|---|---|
| Example | Thermosetting Polymer | Heavy Particulate Filler | Light Particulate Filler | Additives | Specific Gravity |
| 1 | Liquid Epoxy Resin 10-20% wt. | — | Barium sulfate 40-80% wt. | Curatives, processing aids, functional additives and/or pigments 0-15% wt. | 1.5-3.0 |
| 2 | Liquid Epoxy Resin 5-50% wt. | Tungsten powder 40-95% wt. | — | Curatives, processing aids, functional additives and/or pigments 0-15% wt. | 3.0-7.0 |
| 3 | Liquid Epoxy Resin 5-30% wt. | Tungsten 0-95% wt. | Barium sulfate 0-80% wt. | Curatives, processing aids, functional additives and/or pigments 0-15% wt. | 2.5-6.0 |
| 4 | Solid Epoxy Resin 0.5-30% wt. | — | Barium sulfate 70-99.5% wt. | Curatives, processing aids, functional additives and/or pigments 0-15% wt. | 2.0-4.5 |
| 5 | Solid Epoxy Resin 0.5-30% wt. | Tungsten powder 70-99.5% wt. | — | Curatives, processing aids, functional additives and/or pigments 0-15% wt. | 4.5-12 |
| 6 | Solid Epoxy Resin 0.5-30% wt. | Tungsten powder 0-99.5% wt. | Barium sulfate 0-99.5% wt. | Curatives, processing aids, functional additives and/or pigments 0-15% wt. | 2.5-12 |
| 7 | Liquid Urethane Prepolymer 10-20% wt. | Tungsten powder 40-80% wt. | — | Curatives, processing aids, functional additives and/or pigments 0-15% wt. | 2.5-4.5 |
| 8 | Liquid Urethane Prepolymer 10-30% wt. | — | Barium sulfate 40-70% wt. | Curatives, processing aids, functional additives and/or pigments 0-15% wt. | 2.0-3.5 |
| 9 | Liquid Urethane Prepolymer 10-20% wt. | Tungsten powder 0-80% wt. | Barium sulfate 0-70% wt. | Curatives, processing aids, functional additives and/or pigments 0-15% wt. | 2.0-4.5 |
| 10 | Liquid Urethane Prepolymer 10-20% wt. | — | Stainless steel powder 40-80% wt. | Curatives, processing aids functional additives and/or pigments 0-15% wt. | 2.0-4.5 |
| 11 | Liquid Epoxy Resin 10-20% wt. | | Stainless steel powder 50-80% wt. | Curatives, processing aids, functional additives and/or pigments 0-15% wt. | 3.0-5.0 |

Example 12

A composite material having a thickness of 0.25 inches, which includes the following components, is made according to casting processes disclosed herein:

21.75% Epon™ 8280 epoxy resin, available from Hexion 3.25% MPDA curative, available from DuPont 75.0% CIMBAR XF barium sulfate, available from Potters Industries Inc., Malvern, Pa., United States 3 to 5 drops of anti-foaming agent The composite material yields a density of 2.6 grams per cubic centimeter and absorbs or blocks 41.3% of x-ray radiation energy from a 140 kVp x-ray radiation source. A pure lead material having an identical thickness absorbs or blocks 96.3% of x-ray radiation at 140 kVp x-ray radiation source.

Absorption (or blockage) of x-ray radiation is determined by targeting a beam at the material, which is placed approximately fifty (50) inches away from the source of the x-ray radiation. X-ray film is placed underneath the material being tested. X-ray radiation not absorbed or blocked by the material is measurable on the x-ray film.

The composite material has following properties:

95 D hardness 0.4 ft-lb/in notched izod impact strength 4190 psi tensile strength 0.5% elongation 9190 psi flexural strength 1340 ksi flexural modulus 7.1×10^15 ohm-cm volume resistivity 0.449 W/m k thermal conductivity Example 13

A composite material having a thickness of 0.25 inches, which includes the following components, is made according to casting processes disclosed herein:

60.0% 1.38 micron tungsten powder, available as C5-531 from Buffalo Tungsten Inc., Depew, N.Y., United States.

21.75% Epon™ 8280 epoxy resin, available from Hexion 3.25% MPDA curative, available from DuPont 15.0% CIMBAR XF barium sulfate available from Potters Industries Inc.

3 to 5 drops of anti-foaming agent

The composite material yields a density of 3.5 grams per cubic centimeter and absorbs or blocks of 95.6% x-ray radiation energy at 76 kVp x-ray radiation source, which is the same as a pure lead material having an identical thickness at 76 kVp x-ray radiation source The composite material has following properties:

94 D hardness 0.54 ft-lb/in notched izod impact strength 6300 psi tensile strength 0.5% elongation 13400 psi flexural strength 929 ksi flexural modulus 6.45×10^15 ohm-cm volume resistivity 0.658 W/m k thermal conductivity Example 14

A composite material having a thickness of 0.25 inches, which includes the following components, is made according to casting processes disclosed herein:

80.0% 1.32 micron tungsten powder, available as C5-519H, from Buffalo Tungsten 17.4% Epon™ 8280 epoxy resin, available from Hexion 2.60% MPDA curative, DuPont 3 to 5 drops of anti-foaming agent The composite material yields a density of 4.7 grams per cubic centimeter and absorbs or blocks 73.71% of x-ray radiation energy at 300 kVp x-ray radiation source. A pure lead material having an identical thickness absorbs or blocks 95.02% of x-ray radiation at 300 kVp x-ray radiation source.

The composite material has following properties:

95 D hardness 0.66 ft-lb/in notched izod impact strength 11300 psi tensile strength 1.0% elongation 14900 psi flexural strength 855 ksi flexural modulus 0.457×10^15 ohm-cm volume resistivity 1.003 W/m k thermal conductivity Example 15

A composite material is made with the following components according to liquid phase sintering processes disclosed herein:

96.0% 1.38 micron tungsten powder, C5-531, available from Buffalo Tungsten Inc.

3.8% Epon™ 3002 solid epoxy resin, available from Hexion 0.2% MPDA curative, available from DuPont The composite material yields a density of 10.1 grams per cubic centimeter.

Unless otherwise specified, all ranges disclosed herein are inclusive and combinable at the end points and all intermediate points therein. The terms "first," "second," and the like, herein do not denote any order, sequence, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lead-free, non-toxic composite material, said composite material comprising:

a thermosetting polymer;

at least one heavy particulate filler selected from a group consisting of tungsten, osmium, iridium, platinum, gold, molybdenum, tantalum, and combinations thereof, the at least one heavy particulate filler having an average particle size between 0.1 micron and 15 microns; and at least one light particulate filler selected from the group consisting of barium sulfate, bismuth, iodine, zirconium oxide, nickel, copper, silver, titanium, titanium oxide, zinc oxide, zinc sulfide, antimony oxide, aluminum, and combinations thereof, the at least one light particulate filler having an average particle size between 0.5 micron and 15 microns wherein the light particulate filler inhibits settling of the heavy particulate filler in the composite material, and further wherein the composite material comprises a viscosity capable of casting or liquid phase sintering.

2. A lead-free, non-toxic composite material according to claim 1, wherein said composite material comprises a heavy particulate filler and a light particulate filler, further wherein a weight ratio of said heavy particulate filler to said light particulate filler is in a range from about 1:80 to about 99.5:1.

3. A lead-free, non-toxic composite material according to claim 1, further comprising an additive selected from a group consisting of curatives, processing aids, functional additives, pigments and combinations thereof.

4. A lead-free, non-toxic composite material according to claim 1, wherein said thermosetting polymer is present in an amount between about 0.5% to about 50% by weight, based on the total weight of the composition.

5. A lead-free, non-toxic composite material according to claim 4, wherein said thermosetting polymer is present in an amount between about 10% to about 30% by weight, based on the total weight of the composition.

6. A lead-free, non-toxic composite material according to claim 1, wherein said heavy particulate filler is tungsten.

7. A lead-free, non-toxic composite material according to claim 6, wherein said tungsten is present in an amount between about 10% wt. to about 99.5% wt. based on the weight of the composition.

8. A lead-free, non-toxic composite material according to claim 1, wherein said light particulate filler is barium sulfate.

9. A lead-free, non-toxic composite material according to claim 8, wherein said barium sulfate is present in an amount between about 10% wt. to about 99.5% wt. based on the weight of the composition.

10. A lead-free, non-toxic composite material according to claim 1, wherein said thermosetting polymer is selected from a group consisting of epoxy resins, urethanes, silicones, unsaturated esters and combinations thereof.

11. A lead-free, non-toxic composite material according to claim 10, wherein said thermosetting polymer is an epoxy resin.

12. A lead-free, non-toxic composite material according to claim 11, wherein said epoxy resin is in a liquid form.

13. A lead-free, non-toxic composite material according claim 11, wherein said epoxy resin is in a solid form.

14. A lead-free, non-toxic material according to claim 11, wherein the epoxy resin has a viscosity between 110 poise to 150 poise at ambient temperature.

15. A lead-free, non-toxic article, said article comprising the lead-free, non-toxic composite material according to claim 1.

16. A lead-free, non-toxic article according to claim 15, wherein said article is a radiation-shielding device.

17. A lead-free, non-toxic article according to claim 15, wherein said article is a ballast article.

18. A lead-free, non-toxic article according to claim 15, wherein said article is an energy storage article.

19. A lead-free, non-toxic composite material, said composite material comprising:

a thermosetting polymer;

tungsten, having an average particle size between 0.1 micron and 15 microns; and barium sulfate, having an average particle size between 0.5 micron and 15 microns, wherein a weight ratio of the tungsten to the barium sulfate is 4:1.

* * * * *